United States Patent [19]

Ueno

[11] 4,209,793
[45] Jun. 24, 1980

[54] APPARATUS FOR OPTICALLY RECORDING SIGNALS ON A RECORDING MEDIUM

[75] Inventor: Ichiro Ueno, Isehara, Japan

[73] Assignee: Victor Company of Japan, Ltd., Yokohama, Japan

[21] Appl. No.: 969,444

[22] Filed: Dec. 14, 1978

[30] Foreign Application Priority Data

Dec. 17, 1977 [JP] Japan ............................... 52/152253
Mar. 17, 1978 [JP] Japan ................................. 53/30848

[51] Int. Cl.² ......................................... G01D 15/14
[52] U.S. Cl. ............................. 346/108; 179/100.3 V;
 179/100.3 P; 250/204; 346/76 L
[58] Field of Search .............. 346/108, 76 L; 358/128,
 358/297, 302; 179/100.3 V, 100.31, 100.3 P;
 250/201, 202, 204

[56] References Cited

U.S. PATENT DOCUMENTS

| 2,289,054 | 7/1942 | Dimmick | 179/100.3 P X |
| 3,787,888 | 1/1974 | Haskal | 346/108 |
| 3,975,630 | 8/1976 | Zorn | 179/100.3 V X |

Primary Examiner—Joseph W. Hartary

[57] ABSTRACT

An optical recording apparatus comprises a light source for emitting a light beam, a modulator for modulating the light beam with a signal to be recorded, and an optical system for conducting the light beam thus modulated through a specific light path. The light beam has a specific cross-sectional shape which is projected onto a recording medium. The optical system also includes a restricting plate having a slit or hole for restricting the cross-sectional shape of the modulated light beam to the specific shape. A pair of light detectors are irradiated by the modulated light beam of the restricted cross-sectional shape to detect the intensities of the light beam in the vicinity of two end parts. Any difference between the outputs of the two light detectors control the optical system, in response to the detected difference, so that the light intensity distribution of the modulated beam in the restricted cross-sectional shape is maintained symmetrical with respect to the center of light distribution.

6 Claims, 10 Drawing Figures

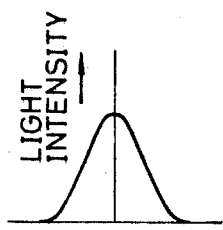
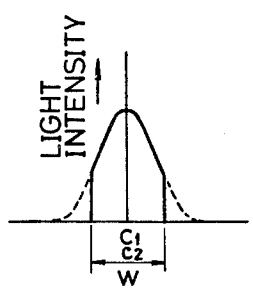
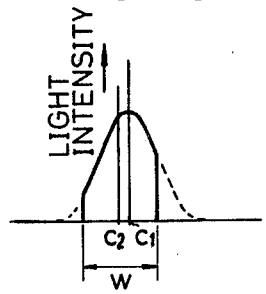
FIG. 2A  FIG. 2B  FIG. 2C
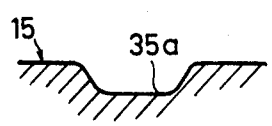
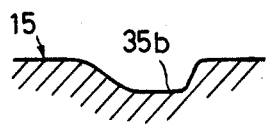
FIG. 3A  FIG. 3B
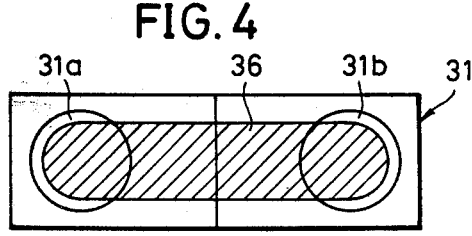
FIG. 4
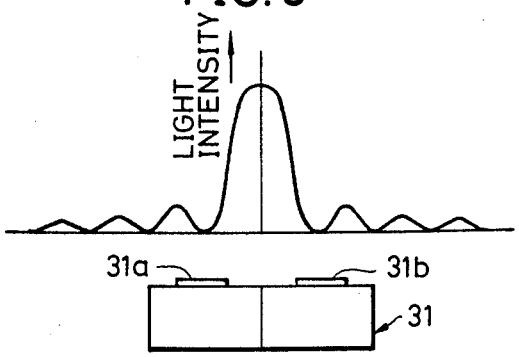
FIG. 5

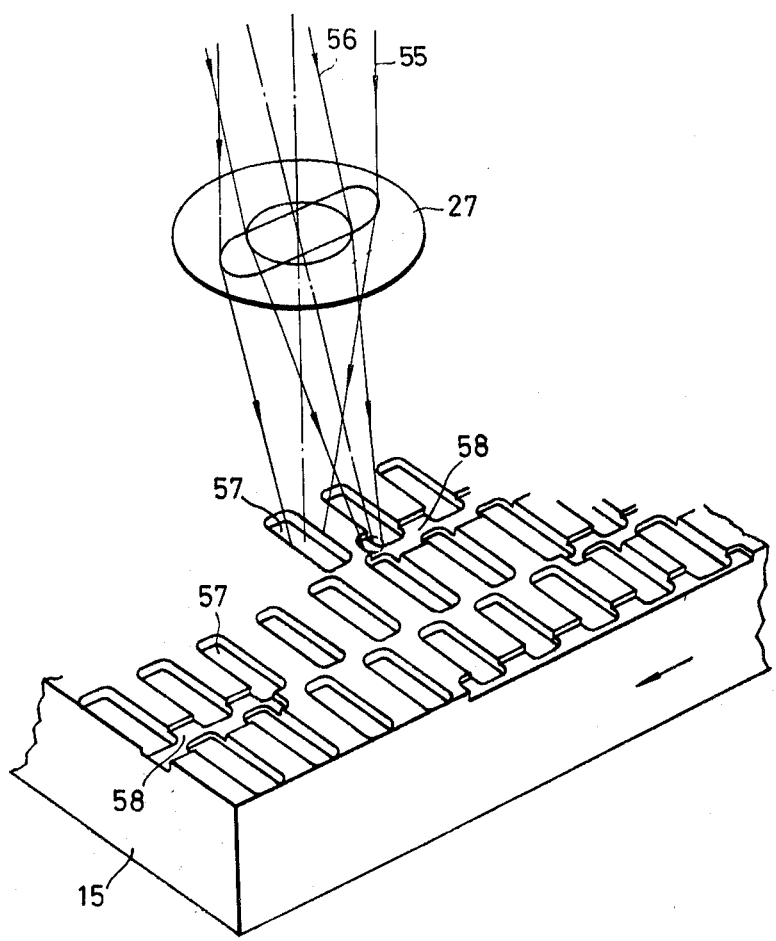

APPARATUS FOR OPTICALLY RECORDING SIGNALS ON A RECORDING MEDIUM

BACKGROUND OF THE INVENTION

The present invention relates to apparatus for optically recording signals on recording mediums, and more particularly to an optical recording apparatus using a light beam for recording a signal on a recording medium as it passes accurately through a prescribed path in an optical system.

In the prior art, there is a system wherein a signal is recorded by forming pits, responsive to the light signal, along a spiral track or concentric circular tracks on a rotary recording medium. In this recording system, a light beam is modulated in response to the signal and projected onto a recording medium coated with a light-sensitive material such as photoresist. Thereafter, the disc is developed to provide an original recorded disc.

The shape of the projected spot of the light beam falling on the original disc is such that the dimension in the track extending direction is less than the dimension in the track width or transverse direction. On another hand, the cross-sectional shape of a light beam emitted from a light source (such as a laser light source) is substantially circular. Accordingly, in order to shape the emitted light beam into the desired spot shape, a cylindrical lens and, in addition, a slit plate having a long narrow slit are used in the optical system.

In general the distribution of the intensity of the light beam, is maximum at the center thereof and the spreading beam exhibits a Gaussian distribution. Consequently, if the center of the Gaussian distribution of a light beam passing through a slit in the slit plate is offset from the center of the slit, the light beam, which has passed through this slit has a limited width, and there is an asymmetrical light intensity distribution. If recording is carried out with a light beam of this character, the pits formed on the recording medium will also have an asymmetrical shape. When a recording medium having this asymmetrical pit formation is reproduced, a good reproduction cannot be carried out. Furthermore, other problems such as nonuniform wear of both the tracing reproducing stylus and the recording medium arise, which shortens their serviceable lives.

On the other hand, the optical system is so adjusted and set at the time of its assembly that the center of the light beam coincides with the center of the slit. However, there are a number of causes of inaccuracy such as, for example, variation due to, change of the emission direction of the laser beam from the laser light source, and nonuniform attenuation across the beam cross section as the laser beam passes through light modulators. Also, with the passage of time, there are extremely small displacements of the lens mounting and adjusting mechanism parts of the optical system. As a result of these and similar causes, even when the above mentioned adjustments and settings are accurately carried out at the time of assembly, the center of the Gaussian distribution of the light beam no longer coincides with the center of the slit during the lifetime of the recording apparatus.

In such a case, it has been the practice heretofore to manually readjust the optical system each time that there is a problem so that the two centers of the beam and slit coincide. This readjustment procedure is extremely troublesome.

Another problem arises during recording in the case where a main information signal and a reference (pilot) signal are projected simultaneously onto the recording medium. The pilot signal is for use in tracking control to insure proper stylus position with respect to the main information signal track at the time of reproducing. During this recording operation, the two recording beams must continually be precisely in a specific positional relationship with respect to each other. However, even if the optical systems of the two recording light beams are correctly adjusted and set, there is the same problem as that discussed above. That is, the problem is one of noncoincidence of the Gaussian distribution center of the light beam and the center of the slit or pin hole. This problem arises with respect to each of the two (information and pilot) optical systems.

SUMMARY OF THE INVENTION

Accordingly, it is a general object of the present invention to provide a novel and useful optical recording apparatus for recording mediums, which overcomes the above described difficulties.

Another and specific object of the invention is to provide an optical recording apparatus for recording mediums, the apparatus having means capable of controlling each optical system. If there is a change during use of the apparatus which normally causes a misalignment of the Gaussian distribution center of the light beam with respect to the center of the slit or pin hole of the slit plate or pin hole plate (due to any of the various above mentioned causes), these centers are continually held in alignment.

Still another object of the invention is to provide an optical recording apparatus which records a main information signal and a reference signal by means of respective light beams. The apparatus includes means for carrying out a beam position control so that, in the optical system of each light beam, the center of the light beam coincides with the center of the slit or pin hole.

Other objects and further features of the invention will be apparent from the following detailed description of preferred embodiments of the invention, when read in conjunction with the accompanying drawings.

BRIEF DESCRIPTION OF THE DRAWINGS

In the drawings:

FIGS. 2A, 2B, and 2C are graphs respectively describing distribution intensities of a light beams;

FIGS. 3A and 3B are sectional views respectively showing sectional shapes of pits formed in a recording medium;

FIG. 4 is a plan view of a light detector;

FIG. 5 is a side view for describing another example of a light detection method;

FIG. 7 is an enlarged, fragmentary, perspective view for describing the state of a light beam projection onto a recording medium, in the apparatus shown in FIG. 6.

DETAILED DESCRIPTION

Figure 1:
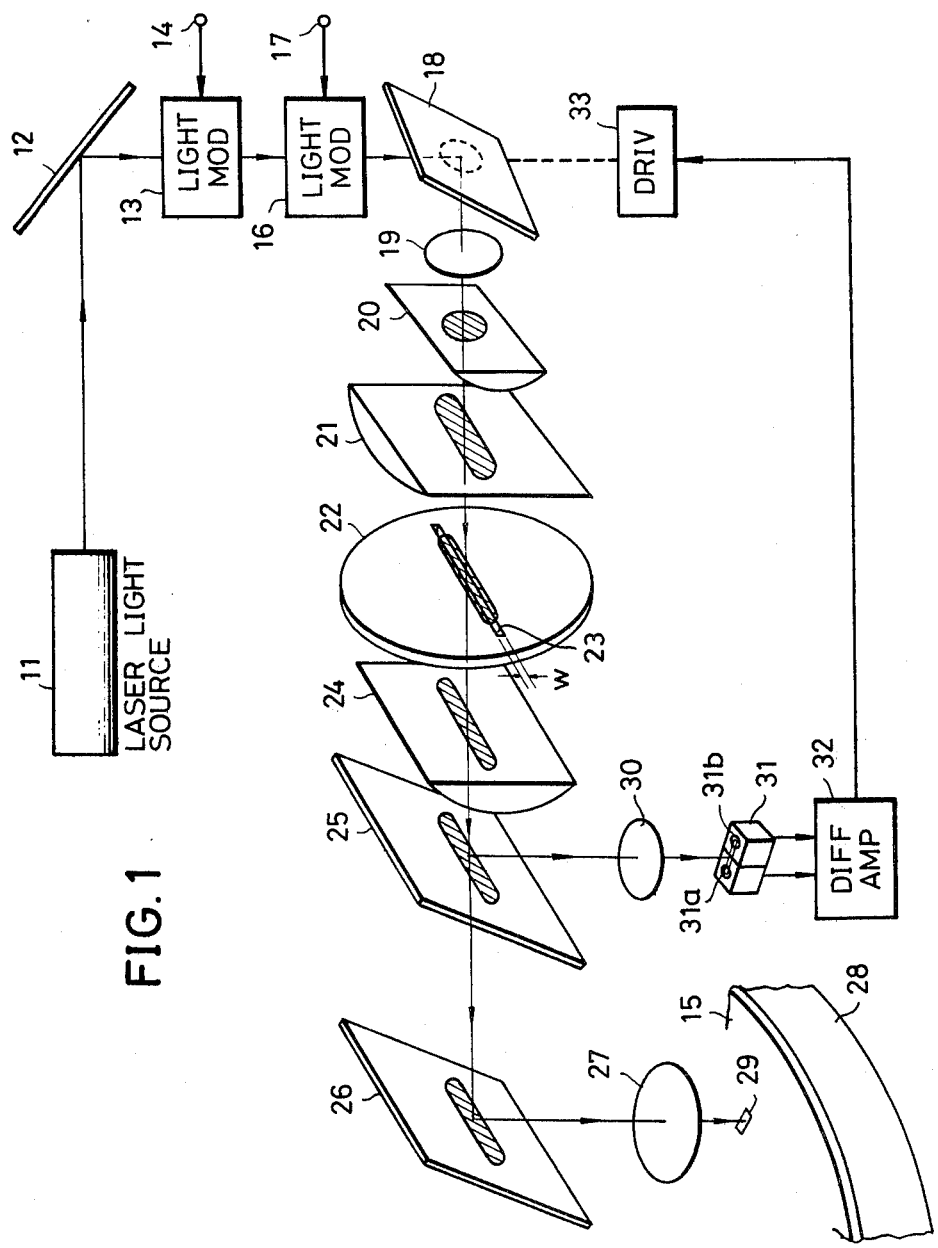
FIG. 1 is a schematic diagram showing the essential parts and organization of one embodiment of the optical recording apparatus according to the invention.

FIG. 1 illustrates one embodiment of the optical recording apparatus according to the present invention. A laser light beam is emitted from a laser light source 11 and reflected by a mirror 12 and thus directed to a light modulator 13. A signal is supplied to light modulator 13 through a terminal 14 responsive to the light beam projection position on a recording medium 15. The light modulator also controls the quantity of the light beam, that is, it carries out a so-called radial compensation. After the light beam has passed through the light modulator 13, it is further modulated in a light modulator 16 by an information signal supplied through a terminal 17. The modulated light beam is reflected by a mirror 18 through a lens 19 and cylindrical lenses 20 and 21 where it is shaped into a light beam of an eliptical cross section. The light beam from the cylindrical lens 21 is directed toward the slit 23 of a slit plate 22. As it passes through this slit 23, a portion of this light beam, in the vicinity of its long sides in cross section, is shielded, whereby its narrow dimension, i.e., the dimension of its short side, is limited.

After the light beam has passed through the slit 23, it passes through a cylindrical lens 24 and a half mirror 25, and is thereafter reflected by a mirror 26 through an objective lens 27, from which it is projected onto the recording medium 15. The recording medium 15 is placed on and rotates unitarily with a turntable 28. At the same time, the recording medium 15 is moved, together with the turntable 28, in the radial direction. A layer of photoresist is formed on the upper surface of the recording medium 15 and is optically activated by the light beam projected thereon. By developing after this optical activation, pits are formed along a spiral track.

As a result of the light beam of elongated circular cross section (as indicated by hatching in FIG. 1) passing through the objective lens 27, the long and short sides of the light beam spot 29 projected onto the recording medium correspond respectively to the short and long sides of the light beam which the mirror 26 and reflects into the objective lens 27. Since the length of the long side of the light beam spot 29 determines the track width, this dimension must be a specific length. This also means that the short dimension of the light beam entering the objective lens 27 is required to have a specific length. For this reason, the above mentioned slit plate 22 is provided.

The light beam of the elongated cross sectional shape, projected toward the slit plate 22, has a light intensity distribution as indicated in FIG. 2A with respect to its narrow width direction, that is, the direction parallel to the short sides. This light intensity has a Gaussian distribution. If the center $C_1$ of the light intensity distribution of the light beam is coincident with the center $C_2$ of the width W of the slit 23, the skirt portions of the light intensity distribution of the light beam projected to the slit plate 22 are symmetrically shielded by the width of slit 23. A light beam has a light intensity distribution with a width which is limited or restricted to W, and which, moreover, has a symmetrical light intensity distribution with respect to the center $C_1$.

In actual practice, however, as mentioned hereinbefore, the optical system is subject to various causes of inaccuracy. For example, there may be a variation of the emission direction of the light beam from the laser light source 11, due to temperature variation, nonuniform attenuation of the light beam over its cross section in the light modulators 13 and 16, and minute change in the mounting positions of the mirror 18, the lenses 19, 20, and 21, the slit plate 22, and other parts. With elapsing time or due to temperature variation other changes may occur. As a result of these causes, there are instances where the center $C_1$ of the light beam intensity distribution becomes offset from the center (with respect to the width direction) of the slit 23 as indicated in FIG. 2C. As is apparent from this figure, the skirt portions of the light intensity distribution of the light beam are asymmetrically shielded. The light intensity distribution of the light beam is limited to the width W and becomes asymmetrical with respect to the center $C_2$.

A pit 35a is formed in the recording medium 15 by being exposed to a beam having a symmetrical light intensity as indicated in FIG. 2B. When the medium is developed the pit has a symmetrical concave shape, in cross section and with respect to the center of the width direction of the pit (track width direction) as shown in FIG. 3A. However, a pit 35b is obtained by being exposed to a beam having an asymmetrical light intensity as indicated in FIG. 2C. Then, when developed, the pit is an asymmetrical concave shape, in cross section with respect to its width direction center as shown in FIG. 3B. When a reproducing stylus traces a track comprising a series of pits of such an asymmetrical shape, not only is it impossible to accurately reproduce the recorded information signal, but also there are undesirable results such as uneven wear of the reproducing stylus and the recording medium and, in extreme cases, there may even be damage or breakage of these parts.

Accordingly, in the apparatus of the present invention, means are provided for preventing the intensity distribution of the light beam passing through the slit 23 from becoming asymmetrical. The light beam of elongated circular cross section which has passed through the cylindrical lens 24 is transmitted through the half mirror 25 as described hereinbefore. At the same time, a portion of this beam is reflected by the half mirror 25. This reflected light beam passes through a lens 30 and is projected onto a light detector 31. This light detector 31 comprises a pair of light detectors 31a and 31b respectively having photodiodes, for example.

The light beam portion from the half mirror 25 passes through the lens 30, similar to the passing of the light beam through the lens 27. The long sides and short sides of the cross section of the light beam entering the lens 30 respectively become the short sides and long sides of the light beam spot projected onto the light detector 31. Accordingly, the direction of the short sides of the light beam entering the lens 30 becomes the direction of the long sides of the light beam spot 36 projected onto the light detector 31 as shown in FIG. 4. The light detectors 31a and 31b are provided at positions corresponding to the two ends of the long sides of the light beam spot 36 in order to detect the light intensities at these positions. By detecting the light intensities at these positions, the light intensities of the two end parts of the light intensity distribution of the light beam of limited width in FIGS. 2B and 2C can be detected.

The detection outputs of the light detectors 31a and 31b are fed to a differential amplifier 32. If the light beam which has passed through the slit 23 has a symmetrical light intensity distribution as indicated in FIG. 2B, the light intensities detected by the light detectors 31a and 31b are the same. Outputs of the same level are obtained respectively from the light detectors 31a and 31b. In this case, therefore, the differential amplifier 32 does not produce any output.

On the other hand, if the light beam which has passed through the slit 23 has an asymmetrical light intensity distribution as indicated in FIG. 2C, different light intensities are detected by the light detectors 31a and 31b. For this reason, the two light detectors 31a and 31b produce respective outputs of different levels, whereby the differential amplifier 32 produces an output signal responsive to the difference between the levels of its input signals.

This output signal of the differential amplifier is fed to a driving mechanism 33 (FIG. 1) which is similar to, for example, a galvanometer. The driving mechanism 33 operates in response to this signal to adjustably rotate the mirror 18 so that the outputs of the light detectors 31a and 31b become equal. That is, the center of the intensity distribution of the light beam passing through the slit 23 coincides with the width center of the slit 23. By this automatic adjustment, control is so accomplished that the intensity distribution of the light beam which has passed through the slit 23 is symmetrical as indicated in FIG. 2B.

While the lens 30 is provided in the above described embodiment of the invention, this lens may be omitted. The light beam reflected by the half mirror 25 may be projected directly onto the light detector 31. The light beam which has passed through the slit 23 is considered in the above description as having a light intensity distribution as indicated in FIG.2B or 2C, for the sake of facilitating understanding. However, strictly speaking, the light beam may have diffraction stripes, and there are secondary, tertiary, . . . diffraction light peaks at the skirt parts of the Gaussian curves, as shown in FIG. 5. Therefore, even when the light detectors 31a and 31b are disposed at positions as shown in FIG. 5 with respect to a light intensity distribution as indicated in the same figure, the symmetry or asymmetry of the intensity distribution of the light beam which has passed through the slit 23 can be detected.

In this connection, while the mirror 18 is rotationally displaced for adjustment by the driving mechanism, in the above described embodiment of the invention, the lens 19 or 20 or the slit plate 22 may undergo a displacement in response to the output of the differential amplifier 32.

Figure 6:
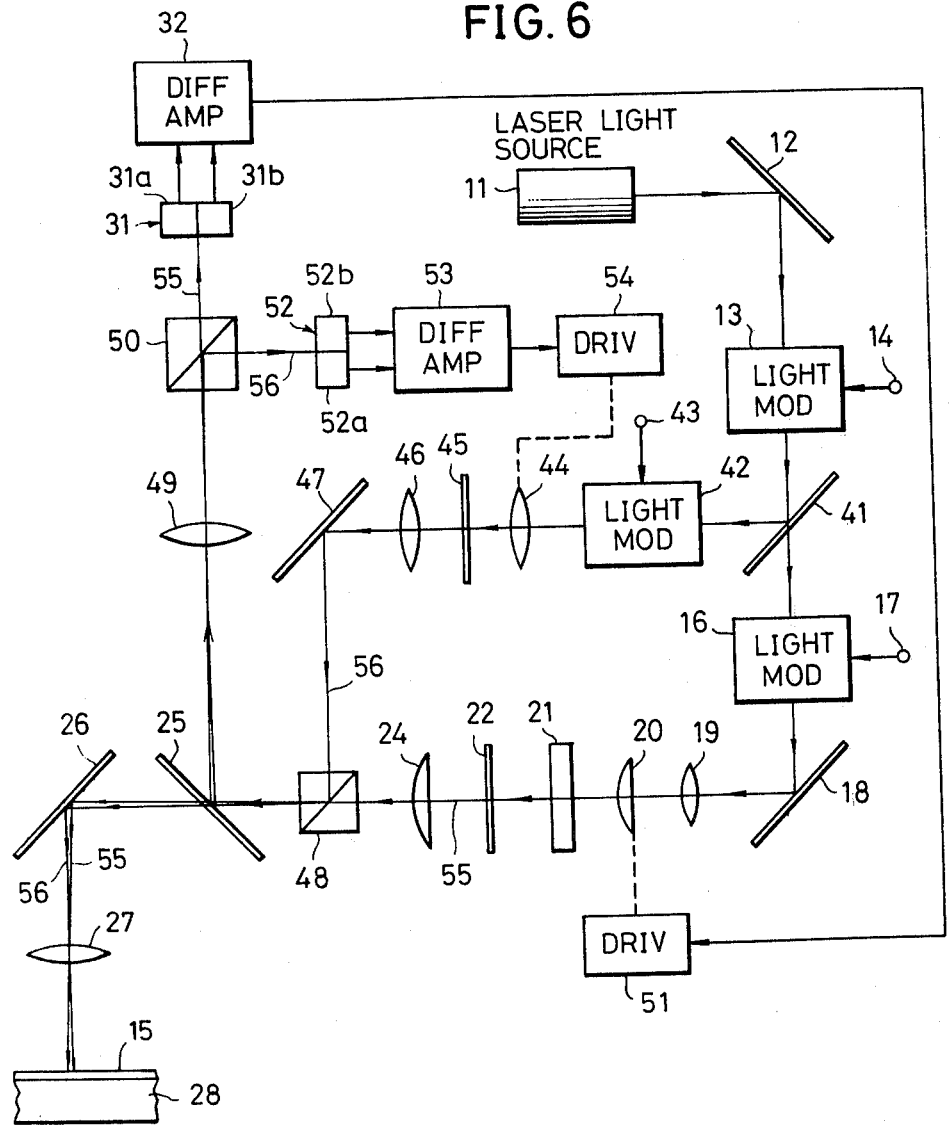
FIG. 6 is a schematic diagram showing the essential parts and organization of another embodiment of the optical recording apparatus according to the invention.

Another embodiment of the optical recording apparatus according to the present invention will now be described in conjunction with FIG. 6. In FIG. 6, those parts which are the same as corresponding parts in FIG. 1 are designated by like reference numerals. A detailed description of such parts will be omitted.

A laser light beam emitted from a laser light source 11 is reflected by a mirror 12 and, after passing through a light modulator 13, is transmitted through a half mirror 41 on one hand to a light modulator 16 and, on the other hand, is reflected by the half mirror 41 to a light modulator 42. A first modulated light beam 55 is produced by modulation of the light beam entering the light modulator 16 responsive to a main information signal received at a terminal 17. This modulated beam is reflected by a mirror 18, through lenses 19, 20, and 21, a slit plate 22, and a lens 24. Thereafter, the modulated beam passes through a polarizing prism 48 and a half mirror 25, is reflected by a mirror 26 through a lens 27, and is projected onto the recording medium 15. This is somewhat similar to the preceding embodiment of the invention.

On the other hand, the light beam entering the light modulator 42 is modulated responsive to a reference signal, used for tracking, which is supplied through a terminal 43. The resulting second modulated light beam 56 is produced as an output from the light modulator 42 and passed through a lens 44, a slit plate 45, and lens 46, and is reflected by a mirror 47. The light propagation direction is changed by the polarizing prism 48, and is transmitted through the half mirror 25, is reflected by the mirror 26, and passes through the lens 27 to be projected onto the recording medium 15. The slit in the above mentioned slit plate 45 need not be of a narrow elongated shape and may be a pin hole.

FIG. 7 illustrates the first and second modulated light beams 55 and 56 passing through the objective lens 27 and being projected onto the recording medium 15. Pits 57 record the main information signal along a spiral track on the recording medium 15 responsive to the first modulated light beam 55, while pits 58 record the reference signal between the track turns of the pits 57 responsive to the second modulated light beam 56. The pits cannot be formed by merely projecting light beams onto the recording medium 15. Of course, a developing process is required thereafter, but the light beams and the pits are shown together, simultaneously, in FIG. 7 for convenience in description.

If, in this recording operation, the spot of the light beam 55 and the spot of the light beam 56 overlap, the quantity of the light projected onto the overlapping areas will increase. For this reason, it is desirable for the light paths of the respective optical systems of the light beams 55 and 56 be set so that the two spots are projected onto the recording medium in spaced apart areas as shown in FIG. 7, so that there is no overlap.

In order to obtain a high recording density on the recording medium, the track of the main information signal formed by the pits 57 is laid out so that the adjacent track turns are in close contact with each other. The reference signal track formed by the pits 58 is laid along side the central position, equidistant between the central lines of mutually adjacent track turns of the main information signal. The reference signal track partly overlaps the main information signal track. When the recording density is made high in this manner, the required tolerance or allowable fluctuation in the relative positional relation between the beam spots on the recording medium of the light beams 55 and 56 is a very severe value, in the order of, for example, 0.1 μm or less.

For this reason, a manual adjustment of the light paths of the two light beams 55 and 56 is extremely difficult. Even if this adjustment is accomplished, the light paths will fluctuate because of the various causes of inaccuracy as mentioned in connection with the preceding embodiment of the invention. It will be extremely difficult to form beam spots of correct light intensity distributions in correct positions on the recording medium. These light path fluctuations occur within a unit of time, such as 30 minutes to 1 hour, required for recording one recording medium, and uniform recording with the light paths continually in an optimum state is difficult.

Accordingly, the present embodiment of the invention affords a solution of this problem. First, the mounting positions of the slit plates 22 and 45 in the optical systems of the first and second light beams are so set that their beam spots are formed at the correct positions shown in FIG. 7. Then, in the optical systems of the first and second light beams, light path control means similar to that described in the preceding embodiment of the invention are respectively provided.

The light beams 55 and 56 from the polarizing prism 48 are transmitted through the half mirror 25. At the same time, portions of these light beams are reflected by the half mirror 25 through a lens 49, and a polarizing prism 50. The first light beam 55 passes through this polarizing prism 50 and is projected onto the light detector 31. The symmetry of the light intensity distribution of this beam 55 is detected as in the preceding embodiment of the invention. In response to the difference between the output levels of light detectors 31a and 31b constituting the light detector 31, a differential amplifier 32 produces an output signal which is fed to a driving mechanism 51. This driving mechanism 51 causes, for example, the lens 20 to be displaced so that the center of the light intensity distribution of the beam entering the slit 23 in the slit plate 22 coincides with the center of that slit. That is, the light intensity distribution of the light beam 55 which has passed through the slit of the slit plate 22 becomes symmetrical as indicated in FIG. 2B.

On the other hand, of the light beams entering the polarizing prism 50, the second light beam 56 changes its light path and is projected onto a light detector 52. This light detector 52 comprises a pair of light detectors 52a and 52b such as, for example, photodiodes similar to the light detector 31. The resulting outputs of these light detectors 52a and 52b are fed to a differential amplifier 53, which thereupon feeds an output signal to a driving mechanism 54 responsive to the difference between the levels of the outputs of the light detectors 52a and 52b. The driving mechanism 54 thereupon causes the lens 44 to be displaced so that the center of the intensity distribution of the light beam entering the slit or pin hole of the slit plate 45 coincides with center of that slit or pin hole.

Therefore, despite the various causes of light path fluctuation, the two light beams 55 and 56 are projected onto the recording medium with an appropriate light intensity distribution. They continually maintain the correct mutual positional relationship.

The medium which is recorded in each of the above described embodiments of the invention has a photoresist layer. However, the recording medium is not thus limited. It is possible to use a recording medium of a type on which recording is accomplished by utilizing the thermal energy of the laser light beam. In this case, the pits are formed by the evaporation of the recording material (such as, for example, aluminum, bismuth, and germanium sulfide) in response to irradiation by the light beam.

Further, this invention is not limited to these embodiments but various modifications may be made without departing from the scope of the invention.

What is claimed is:

1. An apparatus for optically recording signals on a recording medium, comprising:
   a light source for emitting a light beam;
   means for modulating the light beam with a signal to be recorded;
   an optical system for conducting the modulated light beam through a specific light path, imparting to the light beam a specific cross-sectional shape having at least two end parts, and for projecting the light beam onto the recording medium, the optical system including a restricting plate having a slit or hole for restricting the cross-sectional shape of the modulated light beam to the specific shape;
   light detecting means comprising a pair of light detectors positioned to be irradiated by the modulated light beam having the restricted cross-sectional shape for detecting the intensities of said light beam in the vicinity of the two end parts thereof; and
   controlling means for detecting any difference between the outputs of the two light detectors and for controlling the optical system in response to the detected output difference so that the light intensity distribution of the modulated light beam of the restricted cross-sectional shape is maintained symmetrical with respect to the center of the distribution.

2. An optical recording apparatus as claimed in claim 1 in which the controlling means controls the optical system in a manner such that the center of the light intensity distribution of the modulated light beam projected to the restricting plate coincides with the center of the slit or hole of the restricting plate.

3. An optical recording apparatus as claimed in claim 1 in which the optical system further includes a mirror for deflecting the modulated light beam from the modulating means in a direction extending toward the restricting plate, and the controlling means controls the directional orientation of the mirror relative to the position of the restricting plate.

4. An optical recording apparatus as claimed in claim 1 in which the optical system further has lenses for regulating the light path and the cross-sectional shape of the modulated light beam from the modulating means; and the controlling means controls the position of the lens relative to the restricting plate.

5. An optical recording apparatus as claimed in claim 2 in which the controlling means controls the position of the restricting plate.

6. An apparatus for optically recording signals on a recording medium, comprising:
   means for producing two light beams;
   means for modulating one of the two light beams responsive to a first signal to be recorded in order to produce a first modulated light beam;
   means for modulating the other of the two light beams responsive to a second signal to be recorded in order to produce a second modulated light beam;
   first and second optical systems for conducting the first and second modulated light beams respectively through separate specific light paths, imparting respective specific cross-sectional shapes to said modulated light beams, and projecting said modulated light beams onto the recording medium, the first optical system including a first restricting plate having a slit or hole for restricting to a specific shape the cross-sectional shape of the first modulated light beam, the second optical system including a second restricting plate having a slit or hole for restricting the light path of the second modulated light beam in a manner such that the relative position, with respect to the first modulated light beam, of the second modulated light beam projected onto the recording medium becomes constant;
   a pair of first and a pair of second light detection means, each of said pairs being irradiated by an individually associated one of the first and second modulated light beams which have passed through the first and second restricting plates, respectively, and each of said pairs respectively detecting the light intensities in the vicinity of two selected parts of their said individually associated light beams; and first and second control means for detecting the differences between the outputs of the two light detectors in the first or in the second light detecting means, respectively, and for operating in response to the output detected differences to control the first and second optical systems, respectively, so that the first and second modulated light beams pass respectively through the first and second restricting plates in positions such that the centers of the light intensity distributions of the first and second modulated light beams coincide respectively with the centers of the slits or holes of the first and second restricting plates.

* * * * *